(12) United States Patent
Song et al.

(10) Patent No.: US 7,178,700 B2
(45) Date of Patent: Feb. 20, 2007

(54) GREASE GUN PLUNGER

(76) Inventors: Peter Song, 1928 W. Malvern Ave., Fullerton, CA (US) 92833; Yue Rong Wang, 1928 W. Malvern Ave., Fullerton, CA (US) 92833

( * ) Notice: Subject to any disclaimer, the term of this patent is extended or adjusted under 35 U.S.C. 154(b) by 143 days.

(21) Appl. No.: 11/073,068

(22) Filed: Mar. 3, 2005

(65) Prior Publication Data
US 2006/0196890 A1 Sep. 7, 2006

(51) Int. Cl.
*G01F 11/00* (2006.01)
(52) U.S. Cl. .................. 222/262; 222/333; 184/105.2
(58) Field of Classification Search ............... 222/256, 222/258, 261–263, 333, 340, 326–327; 184/105.1, 184/105.2, 33, 7.4, 8–9, 27.1, 32, 38.1–38.3
See application file for complete search history.

(56) References Cited

U.S. PATENT DOCUMENTS

| | | | |
|---|---|---|---|
| 4,257,540 A * | 3/1981 | Wegmann et al. | 222/262 |
| 5,105,912 A * | 4/1992 | Heister | 184/105.2 |
| 7,004,357 B2 * | 2/2006 | Shew | 222/256 |
| 7,032,713 B2 * | 4/2006 | Huang et al. | 184/105.2 |
| 2006/0060426 A1 * | 3/2006 | Chen | 184/105.2 |
| 2006/0070812 A1 * | 4/2006 | Eggleton | 184/105.2 |

* cited by examiner

*Primary Examiner*—Frederick C. Nicolas
(74) *Attorney, Agent, or Firm*—Raymond Y. Chan; David and Raymond Patent Firm

(57) ABSTRACT

A grease gun plunger for a grease gun having an oil injection channel includes a motor driving unit, a plunger unit, and a yoke. The plunger unit includes a bracket having a bracket cavity and an elongated slot longitudinally formed on a rear wall of the bracket to communicate with the bracket cavity, and a plunger pin downwardly extended from the bracket for slidably inserting into the oil injection channel. The yoke, which is substantially held in the bracket cavity of the bracket, has a sliding channel aligning with the elongated slot of the bracket, wherein the driving shaft is slidably inserted into the sliding channel through the elongated slot in such a manner that when the driving shaft is rotated to slide along the sliding channel, the yoke is driven to move in a reciprocating manner along a transverse direction.

23 Claims, 4 Drawing Sheets

GREASE GUN PLUNGER

BACKGROUND OF THE PRESENT INVENTION

1. Field of Invention

The present invention relates to a grease gun, and more particularly to a grease gun comprising a greasing pumping arrangement with enhanced plunger unit for injecting oil out of the grease gun.

2. Description of Related Art

A conventional pumping arrangement for a grease gun usually comprises a motor having a driving shaft, a yoke mounted in a housing for reciprocating movement in the housing, and a plunger mounted in the housing for reciprocating movement of the plunger in the housing so as to inject oil out of the grease gun.

Conventionally, the yoke usually has an exterior surface and a slot formed thereon, whilst the plunger has a head connecting with the slot so that the reciprocating movement of the yoke will drive the plunger to move in the same reciprocating manner for injecting the oil out of the grease gun.

A main disadvantage of this conventional pumping arrangement is that the plunger is easy to be broken. During a typical oil pumping cycle, the plunger is driven to move in a reciprocating manner along an oil injection channel of the grease gun. This means at the moment the plunger is driven to move in different direction (i.e. from upward movement to downward movement, or vice versa), the driving force from the yoke will mainly concentrate at the point of connection between the plunger and the yoke i.e. the head. Therefore, the plunger is easily broken at the head so as to render the entire grease gun unworkable.

Another disadvantage of the above-mentioned conventional grease gun is that the pumping arrangement is usually powered by a motor which is eccentrically and operatively connected with the yoke so that when a driving shaft of the motor is rotating, the yoke is driven to move in the reciprocating manner. Thus, in order to control the rate of pumping oil at the plunger, it is necessary to incorporate a gear unit between the driving shaft and the yoke so that a desirable or selectable rate of dispensing oil from the grease gun can be achieved. The gear unit usually comprises an operation driver having a driving surface operatively connected with the driving shaft of the motor, an opposed driven surface, and a driving pin extended from the driven surface to connect with the yoke. Thus, when the motor rotates, it drives the operation driver to rotate which in turn drive the yoke moving in the above-mentioned reciprocating manner.

The housing in which the yoke is mounted usually has an annular collar wherein the operation driver is rotatably mounted therein via a ball bearing assembly. The disadvantage of this gear unit and the annular collar is that there exists a substantial energy loss during power transmission between the motor and the operation driver via the ball bearing assembly. One may solve this problem by adding lubricating oil at the annular collar for reducing a friction between the ball bearing assembly and the operation driver, but this not only causes substantial inconvenience to the grease gun manufacturer, but also leads to unstable performance of the grease gun as a whole.

SUMMARY OF THE PRESENT INVENTION

A main object of the present invention is to provide a grease gun plunger for a grease gun, wherein the grease gun plunger comprises a grease pumping arrangement with enhanced plunger unit for injecting oil out of the grease gun.

Another object of the present invention is to provide a grease gun plunger comprising a bracket and a plunger pin forming a plunger unit for being driven by a yoke to move in a reciprocating manner, such that the stress created at the plunger pin during an oil pumping cycle is substantially transferred to and evenly distributed on the bracket for enhancing a resistance of the plunger unit against the stress so as to prevent broke down of the plunger pin.

Another object of the present invention is to provide a grease gun plunger comprising a motor driving unit which is compact in size and simple in structure, and is arranged to transmit rotational movement of the motor to the yoke in an effective and stable manner, so as the above-mentioned disadvantage relating to the gear unit can be substantially overcome.

Another object of the present invention is to provide a grease gun which does not involve utilization of any annular collar and any ball bearing assembly in transmitting rotational movement from a power motor to the yoke, thus minimizing any related energy loss during the course of energy transmission at the grease gun plunger.

Another object of the present invention is to provide a grease gun plunger which allow the grease gun to preserve the conventional mechanism of dispensing oil so as to minimize the manufacturing cost of the greasing gun incorporating the grease gun plunger of the present invention.

Another object of the present invention is to provide a grease gun comprising the grease gun plunger with enhanced plunger unit for injecting oil out of the grease gun.

Accordingly, in order to accomplish the above objects, the present invention provides a grease gun plunger for a grease gun having an oil injection channel, wherein the grease gun plunger comprises:

a motor driving unit, having a driving shaft extending eccentrically, adapted for connecting to a power motor of the grease gun to drive the driving shaft to rotate; and a grease pumping arrangement; which comprises:

a plunger unit comprising a bracket having a bracket cavity and an elongated slot longitudinally formed on a rear wall of the bracket to communicate with the bracket cavity, and a plunger pin downwardly extended from the bracket for slidably inserting into the oil injection channel; and a yoke, which is substantially held in the bracket cavity of the bracket, having a sliding channel aligning with the elongated slot of the bracket, wherein the driving shaft is slidably inserted into the sliding channel through the elongated slot in such a manner that when the driving shaft is rotated to slide along the sliding channel, the yoke is driven to move in a reciprocating manner along a transverse direction, such that the plunger pin is reciprocatingly driven by the bracket for injecting oil in the oil injection channel.

These and other objectives, features, and advantages of the present invention will become apparent from the following detailed description, the accompanying drawings, and the appended claims.

DETAILED DESCRIPTION OF THE PREFERRED EMBODIMENT

Figure 1:
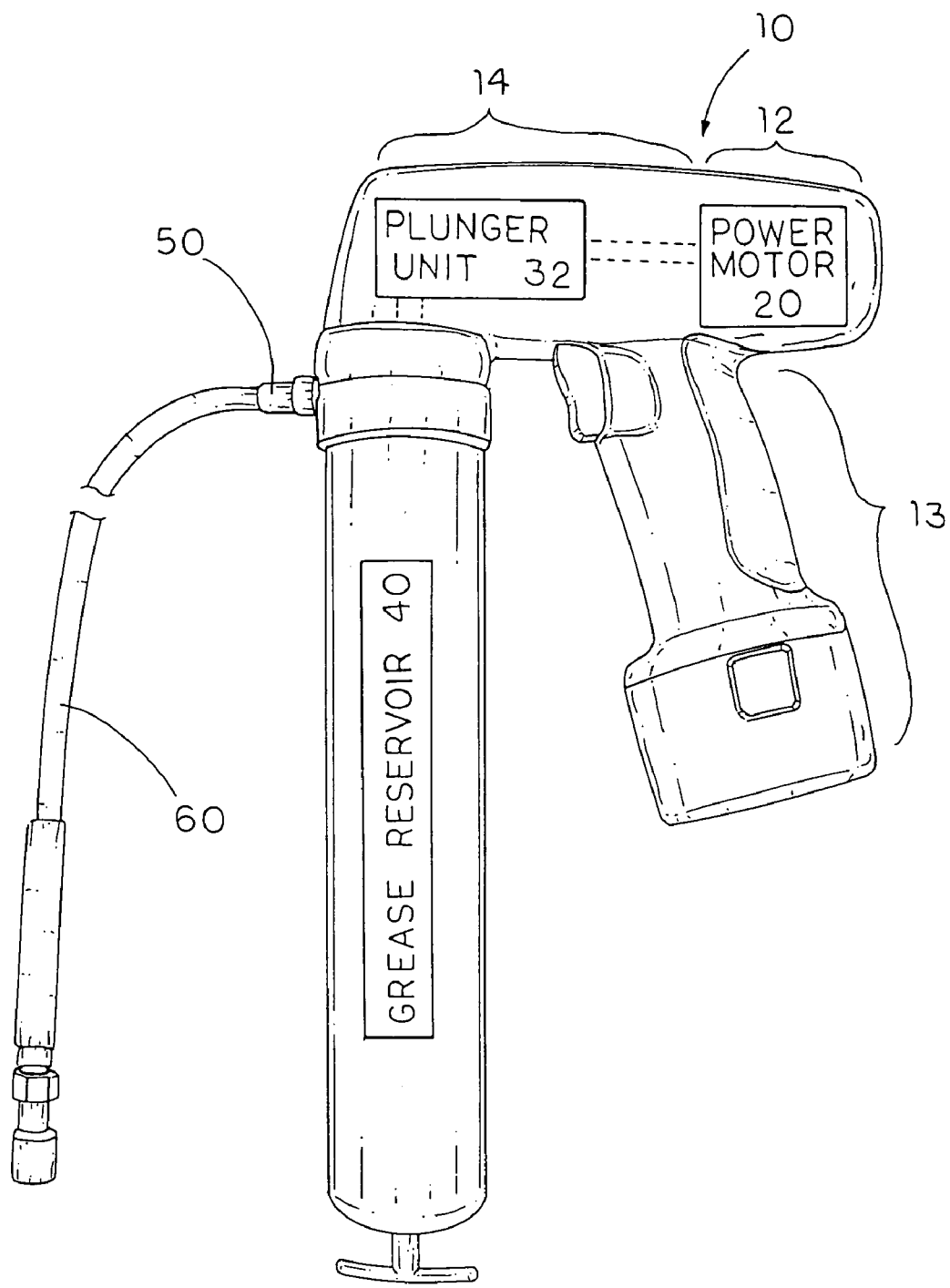
FIG. 1 is a schematic diagram of a grease gun according to a preferred embodiment of the present invention.
Figure 2:
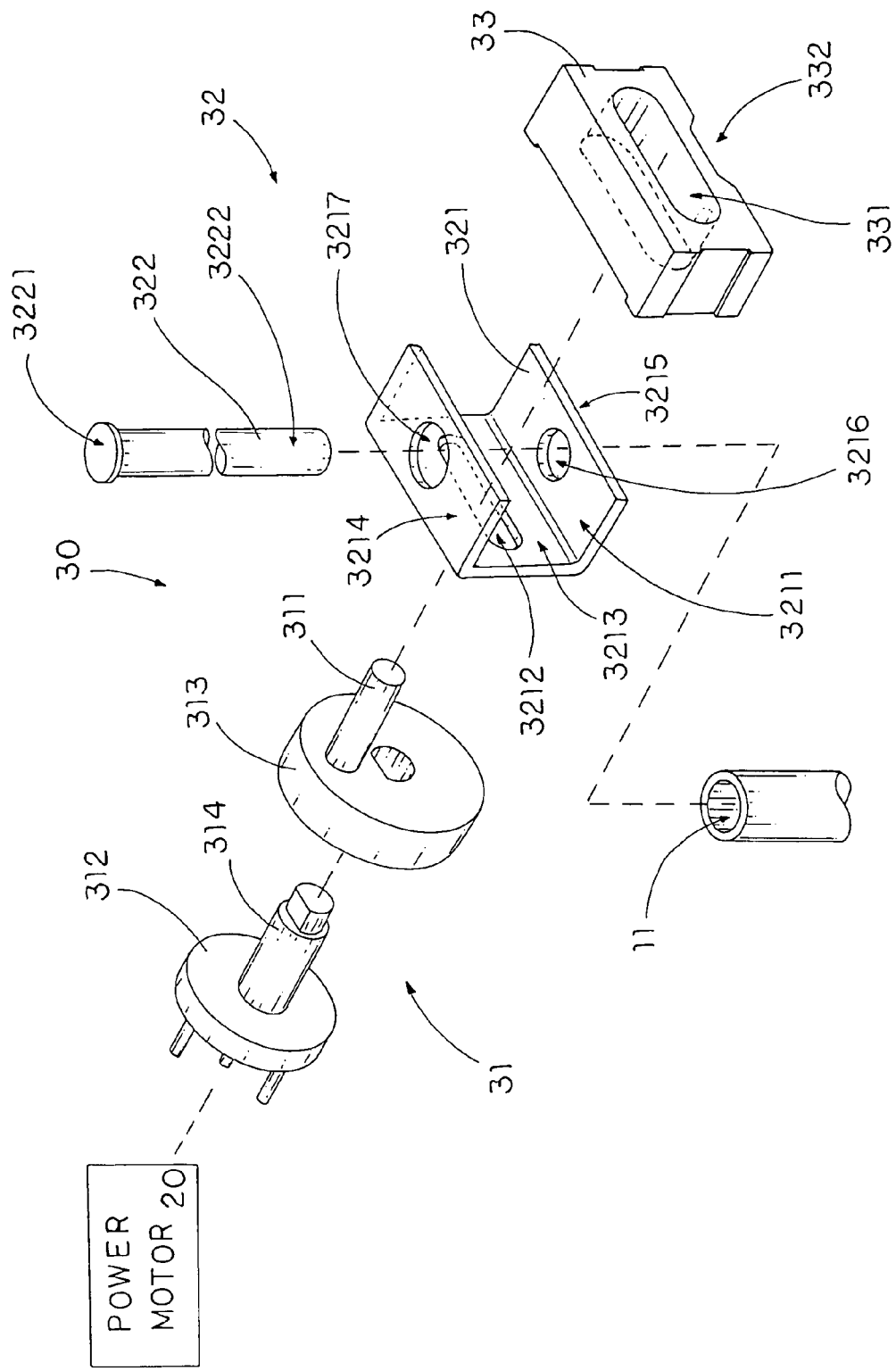
FIG. 2 is an exploded perspective view of the grease gun plunger according to the above preferred embodiment of the present invention.
Figure 3:
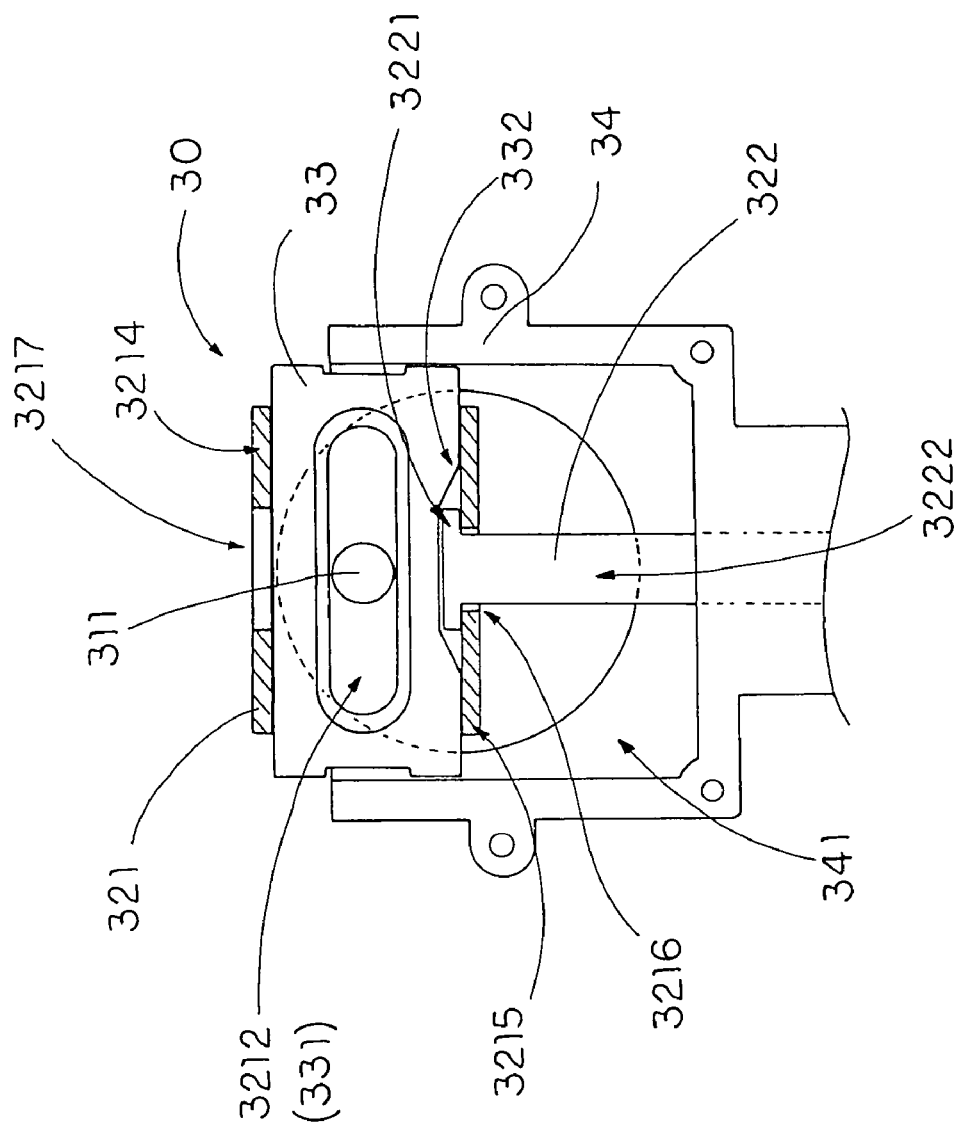
FIG. 3 is a sectional view of a grease gun plunger according to the above preferred embodiment of the present invention.

Referring to FIG. 1 to FIG. 3 of the drawings, a grease gun according to a preferred embodiment of the present invention is illustrated, in which the grease gun comprises a main casing 10 defining an oil injection channel 11, a power motor 20, a grease gun plunger 30 comprising a motor driving unit 31 and a grease pumping arrangement, and a grease reservoir 40 mounted on the main casing 10 to communicate with the oil injection channel 11. The grease reservoir 40 is adapted for storing a predetermined amount of oil, such as conventional lubricating oil, which is to be injected via the oil injection channel 11.

The motor driving unit 31 has a driving shaft 311 eccentrically extended therefrom, and is adapted for connecting to the power motor 20 of the grease gun to drive the driving shaft 311 to rotate.

The grease pumping arrangement which comprises a plunger unit 32 and a yoke 33, wherein the plunger unit 32 comprises a bracket 321 having a bracket cavity 3211 and an elongated slot 3212 longitudinally formed on a rear wall 3213 of the bracket 321 to communicate with the bracket cavity 3211, and a plunger pin 322 downwardly extended from the bracket 321 for slidably inserting into the oil injection channel 11.

Moreover, the yoke 33, which is substantially held in the bracket cavity 3211 of the bracket 321, has a sliding channel 331 aligning with the elongated slot 3212 of the bracket 321, wherein the driving shaft 311 is slidably inserted into the sliding channel 331 through the elongated slot 3212 in such a manner that when the driving shaft 311 is rotated to slide along the sliding channel 331, the yoke 33 is driven to move in a reciprocating manner along a transverse direction, such that the plunger pin 322 is reciprocatingly driven by the bracket 321 for injecting oil in the oil injection channel 11.

Referring to FIG. 1 and FIG. 3 of the drawings, the main casing 10 of the grease gun has a motor portion 12 defining a motor compartment to receive the power motor 20 and the motor driving unit 31, a handle portion 13 transversely extended from the motor portion 12 for allowing a user to grip thereon, and a pump portion 14 defining the oil injection channel 11 which communicates with the motor compartment of the motor portion 12. According to the preferred embodiment of the present invention, the grease gun further comprises an oil injection nozzle 50 provided on the main casing 10 to communicate with the oil injection channel 11 in such a manner that oil retained in the oil injection channel 11 is injected by the grease pumping arrangement out of the grease gun via the oil injection nozzle 50.

Optionally, the grease gun may further comprise a nozzle extension 60, which is embodied as a flexible tube, extended from the oil injection nozzle 50 for delivering the oil over an extended distance from the main casing 10. For example, when lubricating oil is needed in a confined area of a particular machine where it is not possible to place the entire grease gun within that area, the nozzle extension 60 may be utilized to deliver the lubricating oil to that confined area.

The power motor 20 is preferably embodied as an eccentric motor having a motor shaft eccentrically extended therefrom to drive the motor driving unit 31 to rotate. Therefore, the grease gun plunger 30 further comprises a supporting housing 34 mounted in the main casing 10 wherein the motor driving unit 31 and the grease pumping arrangement are supported by the supporting housing 34.

More specifically, the supporting housing 34 has a driver cavity 341 formed therein, wherein the motor driving unit 31 is supported within the drive cavity 341 for transmitting a rotational movement of the power motor 20 to the grease pumping arrangement without using any annular collars and any ball gearing assemblies, as contrasted to the convention arts described above.

Referring to FIG. 2 of the drawings, the motor driving unit 31 comprises a driven plate 312 operatively connected with the power motor 20, an operation driver 313 having the driving shaft 311 extended to slidably receive in the elongated slot 3212, and a spindle 314 having one end integrally connected with the driver plate 312, and another end which has a non-circular cross section connected with the operation driver 313 in such a manner that when the driven plate 312 is driven to rotate, the operation driver 313 is driven by the spindle 314 to rotate for creating the reciprocating movement of the yoke 33 and the plunger unit 32.

Figure 4:
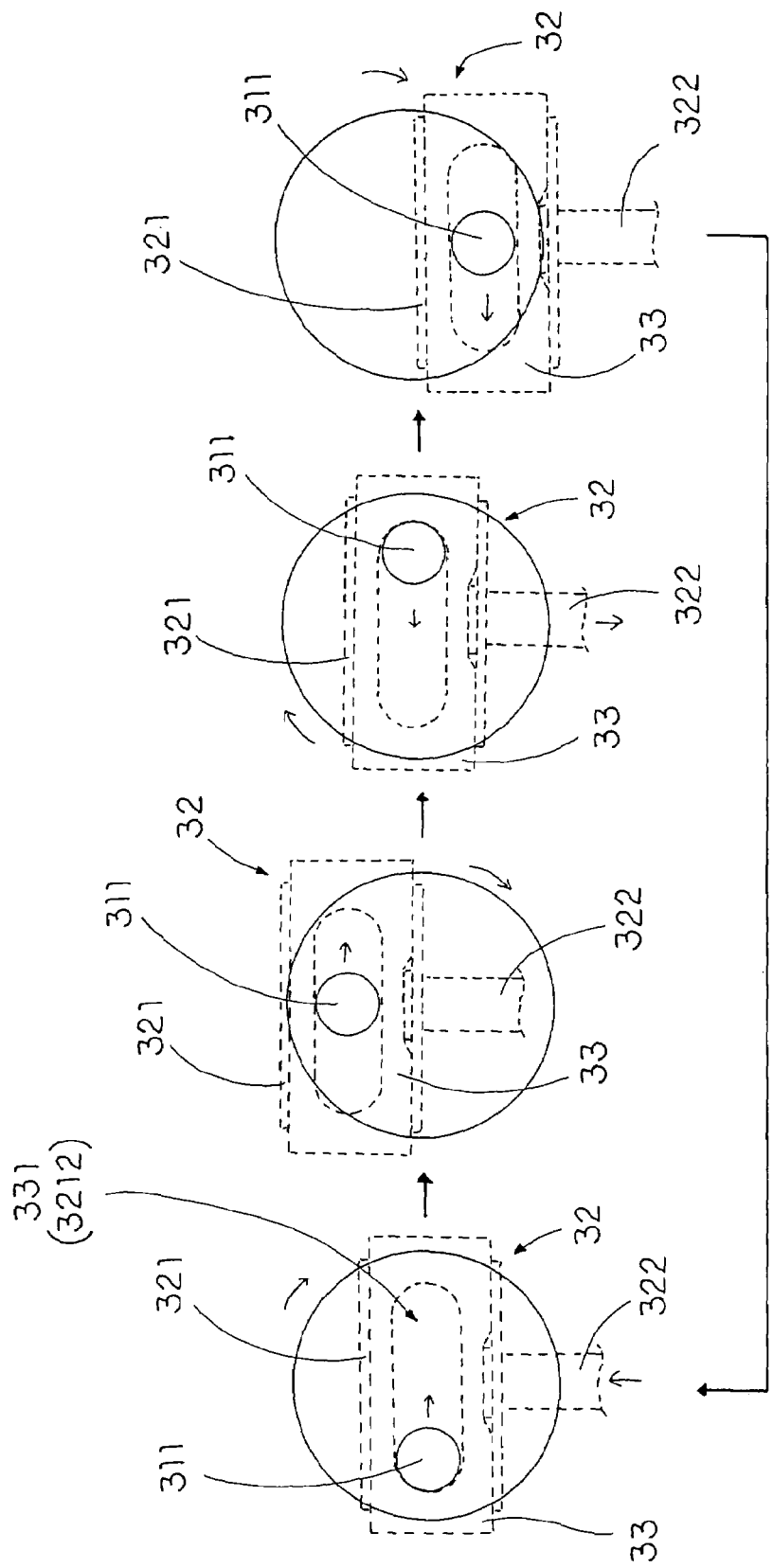
FIG. 4 is a schematic diagram of an operation of the grease gun plunger according to the above preferred embodiment of the present invention.

From the above descriptions, it is worth mentioning that the driving shaft 311 of the motor driving unit 31 is to be driven to move in a circular locus in accordance with rotation movement of the power motor 20. As a result, the circular locus along which the driving shaft 311 is moving should have a diameter smaller than a width of the elongated slot 3212 of the bracket 321 so that when the driving shaft 311 is driven to rotate, the driving shaft 311 is allowed to slide along the elongated slot 3212 and the sliding channel 331 to produce the reciprocating movement for the yoke 33 and the plunger unit 32, as shown in FIG. 4 of the drawings.

The bracket 321, having a U-shape cross section, comprises a top and a bottom wall 3214, 3215 transversely extended from the rear wall 3213 to form the bracket cavity 3211 within the top wall 3214, the bottom wall 3215 and the rear wall 3213, wherein the yoke 33 is shaped and sized to fittedly receive in the bracket cavity 3211 for substantially and effectively transmitting a downward and an upward moving force to the bracket 321 so as to drive the plunger pin 322 moving along the oil injection channel 11 in the above-mentioned reciprocating manner. The bracket 321 is preferably made of metallic materials having a predetermined strength to withstand the impact created at the plunger pin 322 during a typical oil pumping cycle. As such, the stress at the plunger pin 322 is directed and even distributed on the bracket 321 so as to minimize the possibility of cracking or broken down of the plunger pin 322.

The bracket 321 further has a bottom through hole 3216 formed on the bottom wall 3215, wherein the plunger pin 322 has an enlarged head 3221 supported within the bracket cavity 3211, and an elongated body 3222 downwardly extended from the enlarged head 3221 through the bottom wall 3215, wherein the bottom through hole 3216 has a diameter smaller than a diameter of the enlarged head 3221 of the plunger pin 322, such that when the plunger pin 322 slidably inserts through the bottom through hole 3216, the enlarged head 3221 of the plunger pin 322 is substantially retained on the bottom wall 3215 while the elongated body 3222 is extended through the bottom through hole 3216.

The bracket 321 further has a top through hole 3217 which is formed on the top wall 3214 and is coaxially aligned with the bottom through hole 3216, wherein a diameter of the enlarged head 3221 of the plunger pin 322 is smaller than a diameter of the top through hole 3217, such that the enlarged head 3221 of the plunger pin 322 is allowed to slidably pass through the top through hole 3217 of the top wall 3214 and is retained on the bottom wall 3215.

Therefore, in order to attach the plunger pin 322 on the bracket 321, the user of the present invention simply needs to insert the plunger pin 322 through the top through hole 3217 and penetrate the elongated body through the bottom through hole 3216 until the enlarged head 3221 is retained by the bottom wall 3215 in the bracket cavity 3211.

Referring to FIG. 2 to FIG. 3 of the drawings, the yoke 33 further comprises a plunger seat 332 provided at a bottom side thereof, wherein when the yoke 33 is substantially held within the bracket cavity 3211 of the bracket 321, the enlarged head 3221 of the plunger pin 322 is held within the plunger seat 332 against the yoke 33 so as to block up an upward movement of the plunger pin 322 with respect to the yoke 33.

More specifically, the plunger seat 332 is embodied as a retention cavity indently formed at the bottom side of the yoke 33 to align with the bottom through hole 3216 of the bracket 321 such that the enlarged head 3221 of the plunger pin 322 is held at the bottom through hole 3216 within the retention cavity so as to block the upward movement of the plunger pin 322 by the bottom side of the yoke 33.

Referring to FIG. 4 of the drawings, the operation of the present grease gun plunger 30 is as follows: when the driving shaft 311 is driven to rotate it will move in a circular locus consisting of vertical displacement and a horizontal displacement. As shown in FIG. 4, the driving shaft 311 is driven to rotate in a clockwise direction following a circular path which starts at the left-most end of the sliding channel 331. When the driving shaft 311 has completed one quarter of an oil pumping cycle, it has rotated to the upper-most position of the circular path while sliding half-way at the sliding channel 331. As a result, the yoke 33 and the plunger unit 32 are also driven to move upwardly with respect to the supporting housing 34.

When the driving shaft 311 continues to rotate, it has rotated to move downwardly from the upper-most position back to starting vertical position while sliding to the right-most end of the sliding channel 331. At this point, the yoke 33 and the plunger unit 32 is driven to move downwardly to return to the original vertical position.

When the driving shaft 311 has completed three quarters of the oil pumping cycle, the driving shaft 311 has rotated to the lowest-most position of the circular path whereas the yoke 33 and the plunger unit 32 are driven to move downwardly along the oil injection channel 11. As a result, the oil within the oil injection channel 11 is injected out of the grease gun, preferably through a valve, at the oil injection nozzle 50. At this point, the driving shaft 311 is slid back to the halfway of the sliding channel 331.

Finally, the driving shaft 311 completes the oil pumping cycle by returning to its starting position while the yoke 33 and the plunger unit 32 are driven to move upwardly along the oil injection channel 11 which is then refilled with oil for the next oil pumping cycle.

From the forgoing descriptions, it can be shown that the above objects have been substantially achieved. The present invention effectively provides a grease gun plunger with enhanced plunger unit 32 for injecting oil out from the grease gun. Moreover, the stress created at the plunger pin 322 during an oil pumping cycle is substantially transferred to and evenly distributed on the bracket 321 so as to enhance a resistance of the plunger unit 32 against the stress for preventing broke down or cracking of the plunger pin 322.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A grease gun plunger for a grease gun having an oil injection channel, comprising:
    a motor driving unit, having a driving shaft extending eccentrically, adapted for connecting to a power motor of said grease gun to drive said driving shaft to rotate; and
    a grease pumping arrangement; which comprises:
    a plunger unit comprising a bracket having a bracket cavity and an elongated slot longitudinally formed on a rear wall of said bracket to communicate with said bracket cavity, and a plunger pin downwardly extended from said bracket for slidably inserting into said oil injection channel; and
    a yoke, which is substantially held in said bracket cavity of said bracket, having a sliding channel aligning with said elongated slot of said bracket, wherein said driving shaft is slidably inserted into said sliding channel through said elongated slot in such a manner that when said driving shaft is rotated to slide along said sliding channel, said yoke is driven to move in a reciprocating manner along a transverse direction, such that said plunger pin is reciprocatingly driven by said bracket for injecting oil in said oil injection channel.

2. The grease gun plunger, as recited in claim 1, wherein said bracket, having a U-shape cross section, comprises a top and a bottom wall transversely extended from said rear wall to form said bracket cavity within said top wall, said bottom wall and said rear wall, wherein said yoke is shaped and sized to fittedly receive in said bracket cavity for substantially and effectively transmitting a downward and an upward moving force to said bracket so as to drive said plunger pin moving in said oil injection channel in said reciprocating manner.

3. The grease gun plunger, as recited in claim 2, wherein said bracket further has a bottom through hole formed on said bottom wall, wherein said plunger pin has an enlarged head supported within said bracket cavity and an elongated body downwardly extended from said enlarged head through said bottom wall, wherein said bottom through hole has a diameter smaller than a diameter of said enlarged head of said plunger pin, such that when said plunger pin slidably inserts through said bottom through hole, said enlarged head of said plunger pin is substantially retained on said bottom wall while said elongated body is extended through said bottom through hole.

4. The grease gun plunger, as recited in claim 3, wherein said bracket further has a top through hole which is formed on said top wall and is coaxially aligned with said bottom through hole, wherein a diameter of said enlarged head of said plunger pin is smaller than a diameter of said top through hole, such that said enlarged head of said plunger pin is allowed to slidably pass through said top through hole of said top wall and is retained on said bottom wall.

5. The grease gun plunger, as recited in claim 3, wherein said yoke further comprises a plunger seat provided at a bottom side thereof, wherein when said yoke is substantially held within said bracket cavity of said bracket, said enlarged head of said plunger pin is held within said plunger seat to block up an upward movement of said plunger pin with respect to said yoke.

6. The grease gun plunger, as recited in claim 4, wherein said yoke further comprises a plunger seat provided at a bottom side thereof, wherein when said yoke is substantially held within said bracket cavity of said bracket, said enlarged head of said plunger pin is held within said plunger seat to block up an upward movement of said plunger pin with respect to said yoke.

7. The grease gun plunger, as recited in claim 5, wherein said plunger seat is embodied as a retention cavity indently formed at said bottom side of said yoke to align with said bottom through hole of said bracket such that said enlarged head of said plunger pin is held at said bottom through hole within said retention cavity to block said upward movement of said plunger pin by said bottom side of said yoke.

8. The grease gun plunger, as recited in claim 6, wherein said plunger seat is embodied as a retention cavity indently formed at said bottom side of said yoke to align with said bottom through hole of said bracket such that said enlarged head of said plunger pin is held at said bottom through hole within said retention cavity to block said upward movement of said plunger pin by said bottom side of said yoke.

9. The grease gun plunger, as recited in claim 4, wherein said driving shaft of said motor driving unit is driven to move in a circular locus having a diameter smaller than a width of said elongated slot of said bracket so that when said driving shaft is driven to rotate, said driving shaft is allowed to slide along said elongated slot and said sliding channel to produce said reciprocating movement for said yoke and said plunger unit.

10. The grease gun plunger, as recited in claim 7, wherein said driving shaft of said motor driving unit is driven to move in a circular locus having a diameter smaller than a width of said elongated slot of said bracket so that when said driving shaft is driven to rotate, said driving shaft is allowed to slide along said elongated slot and said sliding channel to produce said reciprocating movement for said yoke and said plunger unit.

11. The grease gun plunger, as recited in claim 8, wherein said driving shaft of said motor driving unit is driven to move in a circular locus having a diameter smaller than a width of said elongated slot of said bracket so that when said driving shaft is driven to rotate, said driving shaft is allowed to slide along said elongated slot and said sliding channel to produce said reciprocating movement for said yoke and said plunger unit.

12. The grease gun plunger, as recited in claim 1, further comprising a supporting housing having a driver cavity formed therein, wherein said motor driving unit is supported within said drive cavity for transmitting said rotational movement of said power motor to said grease pumping arrangement without using an annular collar and a ball bearing assembly.

13. The grease gun plunger, as recited in claim 11, further comprising a supporting housing having a driver cavity formed therein, wherein said motor driving unit is supported within said drive cavity for transmitting said rotational movement of said power motor to said grease pumping arrangement without using an annular collar and a ball bearing assembly.

14. The grease gun plunger, as recited in claim 12, wherein said motor driving unit comprises a driven plate operatively connected with said power motor, an operation driver having said driving shaft extended to slidably receive in said elongated slot, and a spindle rotatably supported in said driver cavity to connect said driven plate with said operation driver in such a manner that when said driven plate is driven to rotate, said operation driver is driven by said spindle to rotate for creating said reciprocating movement of said yoke and said plunger unit.

15. The grease gun plunger, as recited in claim 13, wherein said motor driving unit comprises a driven plate operatively connected with said power motor, an operation driver having said driving shaft extended to slidably receive in said elongated slot, and a spindle rotatably supported in said driver cavity to connect said driven plate with said operation driver in such a manner that when said driven plate is driven to rotate, said operation driver is driven by said spindle to rotate for creating said reciprocating movement of said yoke and said plunger unit.

16. A grease gun, comprising:
  a main casing, defining an oil injection channel within said main casing, has an oil injection nozzle communicating with said oil injection channel;
  a power motor supported in said main casing;
  a grease reservoir provided on said main casing to communicate with said oil injection channel; and
  a grease gun plunger, which comprises:
  a motor driving unit, having a driving shaft extending eccentrically, adapted for connecting to a power motor to drive said driving shaft to rotate eccentrically; and
  a grease pumping arrangement, which comprises:
  a plunger unit, which comprises:
  a bracket, having a U-shaped cross section, comprising a rear wall, a top wall, and a bottom wall transversely extended from said rear wall to form a bracket cavity within said top wall, said bottom wall and said rear wall, wherein said rear wall has an elongated slot longitudinally formed thereon to communicate with said bracket cavity; and
  a plunger pin downwardly extended from said bracket for slidably inserting into said oil injection channel; and
  a yoke, which is shaped and sized to fittedly receive in said bracket cavity for substantially and effectively transmitting a downward and an upward moving force to said bracket, having a sliding channel aligning with said elongated slot of said bracket, wherein said driving shaft is slidably inserted into said sliding channel through said elongated slot in such a manner that when said driving shaft is rotated to slide along said sliding channel, said yoke is driven to move in a reciprocating manner along a transverse direction, such that said plunger pin is reciprocatingly driven by said bracket for injecting oil in said oil injection channel to be dispensed via said oil injection nozzle.

17. The grease gun, as recited in claim 16, wherein said bracket further has a bottom through hole formed on said bottom wall, wherein said plunger pin has an enlarged head supported within said bracket cavity and an elongated body downwardly extended from said enlarged head through said bottom wall, wherein said bottom through hole has a diameter smaller than a diameter of said enlarged head of said plunger pin, such that when said plunger pin slidably inserts through said bottom through hole, said enlarged head of said plunger pin is substantially retained on said bottom wall while said elongated body is extended through said bottom through hole.

18. The grease gun, as recited in claim 17, wherein said bracket further has a top through hole which is formed on said top wall and is coaxially aligned with said bottom through hole, wherein a diameter of said enlarged head of said plunger pin is smaller than a diameter of said top through hole, such that said enlarged head of said plunger pin is allowed to slidably pass through said top through hole of said top wall and is retained on said bottom wall.

19. The grease gun, as recited in claim 18, wherein said yoke further comprises a plunger seat provided at a bottom side thereof, wherein when said yoke is substantially held within said bracket cavity of said bracket, said enlarged head of said plunger pin is held within said plunger seat to block up an upward movement of said plunger pin with respect to said yoke.

20. The grease gun, as recited in claim 19, wherein said plunger seat is embodied as a retention cavity indently formed at said bottom side of said yoke to align with said bottom through hole of said bracket such that said enlarged head of said plunger pin is held at said bottom through hole within said retention cavity to block said upward movement of said plunger pin by said bottom side of said yoke.

21. The grease gun, as recited in claim 20, wherein said driving shaft of said motor driving unit is driven to move in a circular locus having a diameter smaller than a width of said elongated slot of said bracket so that when said driving shaft is driven to rotate, said driving shaft is allowed to slide along said elongated slot and said sliding channel to produce said reciprocating movement for said yoke and said plunger unit.

22. The grease gun, as recited in claim 21, further comprising a supporting housing having a driver cavity formed therein, wherein said motor driving unit is supported within said drive cavity for transmitting said rotational movement of said power motor to said grease pumping arrangement without using an annular collar and a ball bearing assembly.

23. The grease gun, as recited in claim 22, wherein said motor driving unit comprises a driven plate operatively connected with said power motor, an operation driver having said driving shaft extended to slidably receive in said elongated slot, and a spindle rotatably supported in said driver cavity to connect said driven plate with said operation driver in such a manner that when said driven plate is driven to rotate, said operation driver is driven by said spindle to rotate for creating said reciprocating movement of said yoke and said plunger unit.

* * * * *